US010198156B2

(12) United States Patent
Stefan et al.

(10) Patent No.: US 10,198,156 B2
(45) Date of Patent: Feb. 5, 2019

(54) MERGING ARTIFACT INFORMATION SYSTEM AND METHOD

(71) Applicant: POLARION AG, Gossau (CH)

(72) Inventors: Tomas Stefan, Velká Dobrá (CZ); Jan Stawarczyk, Prague (CZ); Yury Chernikov, Prague (CZ); Leila Yelemessova, Prague (CZ)

(73) Assignee: Polarion AG, Gossau (CH)

( * ) Notice: Subject to any disclaimer, the term of this patent is extended or adjusted under 35 U.S.C. 154(b) by 0 days.

(21) Appl. No.: 15/443,585

(22) Filed: Feb. 27, 2017

(65) Prior Publication Data

US 2018/0246869 A1 Aug. 30, 2018

(51) Int. Cl.
G06F 17/00 (2006.01)
G06F 3/0484 (2013.01)
(Continued)

(52) U.S. Cl.
CPC .......... *G06F 3/0484* (2013.01); *G06F 3/0482* (2013.01); *G06F 17/2211* (2013.01); *G06F 17/24* (2013.01)

(58) Field of Classification Search
CPC .............................. G06F 3/0482; G06F 3/0484
(Continued)

(56) References Cited

U.S. PATENT DOCUMENTS 8,839,100 B1* 9/2014 Orofino, II .......... G06F 17/2288
715/205
9,292,505 B1* 3/2016 Cooke ............... G06F 17/30867
(Continued)

OTHER PUBLICATIONS

Keogh et al., Relevance Feedback Retrieval of Time Series Data, ACM 1999, pp. 183-190.*

(Continued)

Primary Examiner — Cong-Lac Huynh
(74) Attorney, Agent, or Firm — Henry M. Feiereisen LLC

(57) ABSTRACT

A system and method is provided that facilitates merging artifact information. The system may comprise a processor configured to generate a graphical user interface (GUI) through a display device that enables a first sequence of artifact information of at least one first artifact document and a second sequence of artifact information of at least one second artifact document stored in a data store and of a merge bar to be displayable in the GUI; to receive at least one first input through an input de-vice corresponding to a first selection of the at least one first artifact document and of the at least one second artifact document; to cause the first sequence of artifact information of the at least one first artifact document and the second sequence of artifact information of the at least one second artifact document corresponding to the first selection to be displayed in the GUI; to determine at least one first subsequence of the first sequence and at least one second subsequence of the second sequence which are at least related to each other; to cause the at least one first subsequence and the at least one second subsequence to be displayed in the GUI in a highlighted manner; to receive at least one second input through the input device corresponding to a second selection of the at least one first subsequence and the at least one second subsequence which are to be merged; to determine at least one merge action available for merging the at least one first subsequence and the at least one second subsequence corresponding to the second selection; to cause the at least one merge action to be displayed in the merge bar in the GUI; to receive at least one third input through the input device corresponding to a third selection of the at least one merge action; and to create at least one first amended subsequence of artifact information by merging the at least one first subsequence and at least one
(Continued)

second subsequence according to the at least one merge action corresponding to the third selection.

28 Claims, 10 Drawing Sheets

(51) Int. Cl.
  *G06F 3/0482* (2013.01)
  *G06F 17/22* (2006.01)
  *G06F 17/24* (2006.01)

(58) Field of Classification Search
  USPC .................................................. 715/255, 273
  See application file for complete search history.

(56) References Cited

U.S. PATENT DOCUMENTS

| | | | | |
|---|---|---|---|---|
| 2005/0204367 A1* | 9/2005 | Minium, Jr. | ............ | G06F 9/541 719/328 |
| 2005/0261787 A1* | 11/2005 | Plante | ...................... | G06F 8/71 700/30 |
| 2005/0262485 A1* | 11/2005 | Plante | ...................... | G06F 8/71 717/136 |
| 2008/0046858 A1* | 2/2008 | McClean | ................... | G06F 8/71 717/100 |
| 2008/0104581 A1* | 5/2008 | Clemm | ..................... | G06F 8/71 717/162 |
| 2009/0037912 A1* | 2/2009 | Stoitsev | .............. | G06F 9/45512 718/100 |
| 2010/0077380 A1* | 3/2010 | Baker | ...................... | G06F 8/71 717/120 |
| 2010/0088676 A1* | 4/2010 | Yuan | ................... | G06F 17/2288 717/120 |
| 2012/0233250 A1* | 9/2012 | Man | .................. | G06F 17/30722 709/204 |
| 2015/0370791 A1* | 12/2015 | Solheim | ............ | G06F 17/30622 707/706 |
| 2016/0239565 A1* | 8/2016 | Falkner | ............. | G06F 17/30719 |
| 2016/0259778 A1* | 9/2016 | Cookson | .............. | G06F 17/2785 |
| 2017/0220952 A1* | 8/2017 | Baughman | ........... | G06N 99/005 |
| 2017/0372247 A1* | 12/2017 | Tauber | ...................... | G06F 8/30 |

OTHER PUBLICATIONS

Aizenbud-Reshef et al., Model Traceability, IBM Systems Journal 2006, pp. 515-526.*

Happel et al., Potentials and Challenges of Recommendation Systems for Software Development, ACM 2008, pp. 11-15.*

Don et al., Discovering Interesting Usage Patterns in Text Collections: Integrating Text Mining with Visualization, ACM 2007, pp. 213-221.*

Cinque et al., Segmentation of Page Images Having Artifacts of Photocopy and Scanning, Elsevier , pp. 1167-1177. (Year: 2002).*

Bailer et al., Detecting and Clustering Multiple Tasks of One Scene, Springer, pp. 80-89. (Year: 2008).*

* cited by examiner

FIG 2

| 1.1 Login Page | | |
|---|---|---|
| 1.1.1 - ⬚EXPE-514 – The page must have a login button. | | ⬚EXPE-514 – The page must have a big login button. (Frozen reference to rev #39909) |
| Title | The page must have a ~~big~~ login button. | The page must have a big login button. |
| Description | The page must have a ~~big~~ login button. | Does not exist |
| 1.1.1.1 - ⬚EXPE-515 – The login button must be bright Red. | | |
| Title | The login button must be bright Red. | |
| Description | The login button must be bright Red. | |
| 1.1.1.2 - ⬚EXPE-516 – The login button must be 300(w) x 150(h) pixels. | | |
| Title | The login button must be 300(w) x 150(h) pixels. | Does not exist |
| Description | The login button must be 300(w) x 150(h) pixels. | |
| 1.1.2 - ⬚EXPE-525 – The page must have a logout button. | | |
| Title | | |
| Description | | |
| 1.1.2.1 - ⬚EXPE-526 – The login button must be bright Gray. | | |
| Title | The login button must be bright Gray. | Does not exist |
| Description | The login button must be bright Gray. | |

FIG 5

| ◀ Back | ⚙▼ | Comparing System Requirements...#94 | ⬍ | System Requirements...#94 as | Document | Work Items | Fields |

138 — System Requirements Version 2 #94 | 128 — System Requirements #94

3 Requirements
3.1 General Operations

| 3.1-1 | 🗎 DP-313 - DrivePilot shall easily engage operations while the vehicle is at rest (Frozen reference to rev #1) | 🗎 DP-313 - DrivePilot shall easily engage operations while the vehicle is at rest |
| --- | --- | --- |
| Severity | ☐ Must have | ☒ Should have |

| 3.1-2 | 🗎 DP-504 - DrivePilot may not be engaged while the vehicle is under manual control. "provid... (Branched from 🗎 DP-314) | 🗎 DP-314 - DrivePilot may not be engaged while the vehicle is under manual control. "provi... |
| --- | --- | --- |
| Title | DrivePilot may not be engaged while the vehicle is under manual control | DrivePilot may not be engaged while the vehicle is under manual control. |
| Description | - provide voice authentification<br>- provide handicap access | - provide voice authentification<br>- provide handicap access |
| Status | ☑ Draft | ✓ Approved |
| Severity | ☒ Should have | ☐ Must have |
| Linked Work Items | is branched from 🗎🗎 DP-314 - DrivePilot may not be engaged while the vehicle is under manual control. "provid 1<br>has parent: ☐ DP-487 - General Operations | has parent: ☐ DP-312 - General Operations |

| 3.1-6 | 🗎 DP-505 - DrivePilot shall operate with input power of 12 Volts, not to exceed 12 Amps wit... (Branched from 🗎 DP-350) | 🗎 DP-350 - DrivePilot shall operate with input power of 12 Volts, not to exceed 15 Amps wit... — 124 |
| --- | --- | --- |
| Title | DrivePilot shall operate with input power of 12 Volts, not to exceed 🗎 12 Amps wit. | DrivePilot shall operate with input power of 12 Volts, not to exceed 🗎 12 Amps wit. |
| Description | DrivePilot shall operate with input power of 12 Volts, not to exceed 🗎 12 Amps with a +/- tolerance of 10% | DrivePilot shall operate with input power of 12 Volts, not to exceed 🗎 12 Amps with a +/- tolerance of 10% |
| Status | ☑ Draft | ✓ Approved |
| Severity | ☒ Should have | ☐ Must have |
| Linked Work Items | is branched from 🗎🗎 DP-350 - DrivePilot shall operate with input power of 12 Volts, not to exceed 12 Amps wit...<br>has parent: ☐ DP-487 - General Operations | has parent: ☐ DP-312 - General Operations |

3.2 User Console

| 3.2-2.3 | 🗎 DP-324 - The DrivePilot user console will operate in the following platforms: — 142 | Item is in the Recycle Bin |
| --- | --- | --- |
| | 🗎 DP-338 - Android Application (Bluetooth) (Live reference) | |
| Title | Android Application (Bluetooth) | |
| Description | Android Application (Bluetooth) | |

Figure 7:
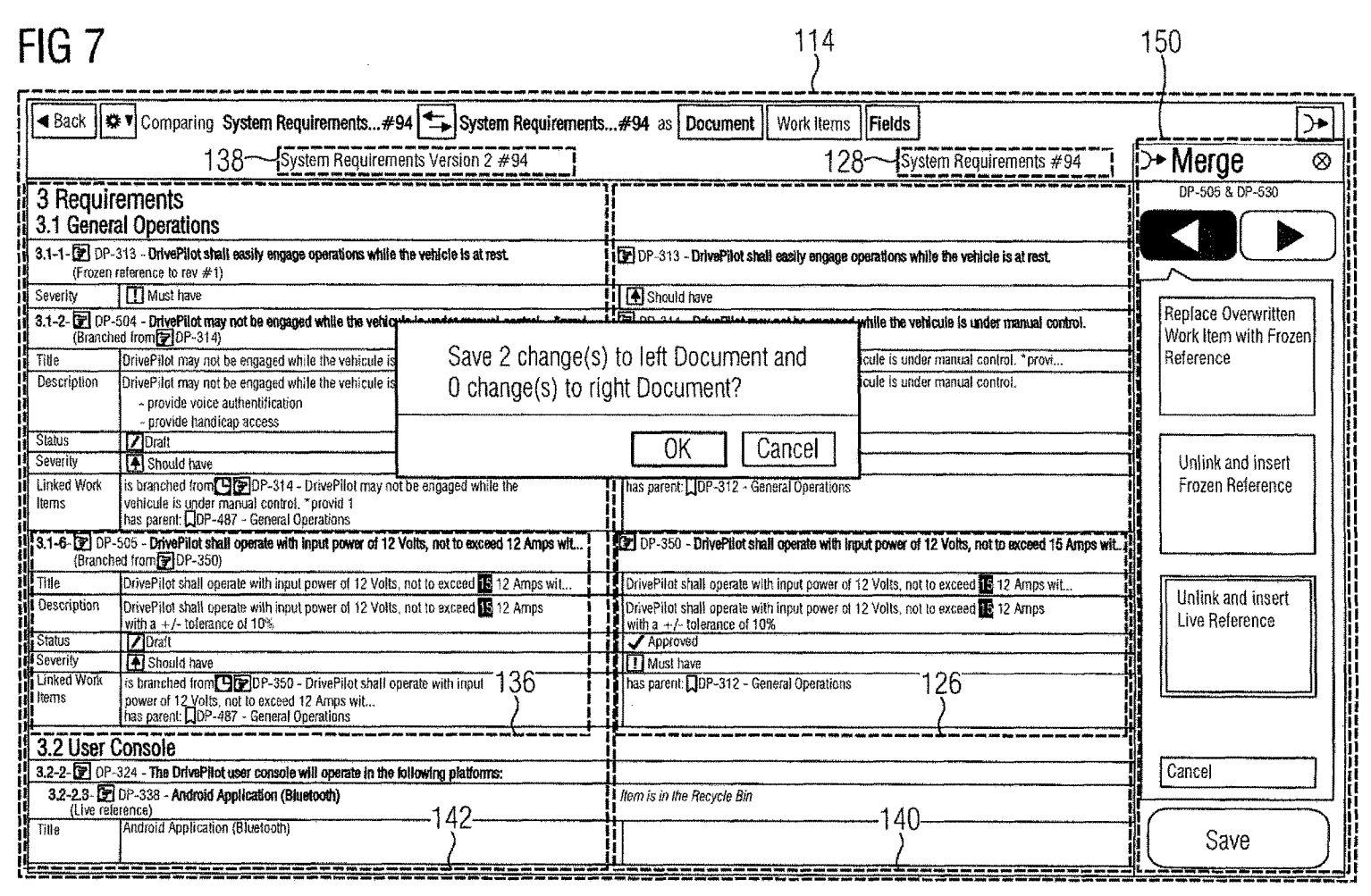

[Figure 7: Screenshot showing a software interface for comparing System Requirements #94 with a Merge dialog box and a "Save 2 change(s) to left Document and 0 change(s) to right Document?" confirmation popup. Reference numerals include 114, 126, 128, 136, 138, 140, 142, 150.]

MERGING ARTIFACT INFORMATION SYSTEM AND METHOD

TECHNICAL FIELD

The present disclosure is directed, in general, to product lifecycle management (PLM) systems, application lifecycle management (ALM) systems, in particular for software, artifact information systems and similar systems, that are used to create, use, and manage data for products comprising software and artifacts and other items (collectively referred to herein as product systems).

BACKGROUND OF THE INVENTION

Product systems may include stored content associated with products comprising software and artifacts and other items. Such product systems may benefit from improvements.

SUMMARY OF THE INVENTION

Variously disclosed embodiments include data processing systems and methods that may be used to facilitate merging artifact information.

In one example, a system for merging artifact information of at least one first artifact document and of at least one second artifact document may comprise at least one processor configured to generate a graphical user interface (GUI) through a display device that enables a first sequence of artifact information of the at least one first artifact document and a second sequence of artifact information of the at least one second artifact document stored in a data store and of a merge bar to be displayable in the GUI; to receive at least one first input through an input de-vice corresponding to a first selection of the at least one first artifact document and of the at least one second artifact document; to cause the first sequence of artifact information of the at least one first artifact document and the second sequence of artifact information of the at least one second artifact document corresponding to the first selection to be displayed in the GUI; to determine at least one first subsequence of the first sequence and at least one second subsequence of the second sequence which are at least related to each other; to cause the at least one first subsequence and the at least one second subsequence to be displayed in the GUI in a highlighted manner; to receive at least one second input through the input device corresponding to a second selection of the at least one first subsequence and the at least one second subsequence which are to be merged; to determine at least one merge action available for merging the at least one first subsequence and the at least one second subsequence corresponding to the second selection; to cause the at least one merge action to be displayed in the merge bar in the GUI; to receive at least one third input through the input device corresponding to a third selection of the at least one merge action; and to create at least one first amended subsequence of artifact information by merging the at least one first subsequence and at least one second subsequence according to the at least one merge action corresponding to the third selection.

In another example, a method for merging artifact information of at least one first artifact document and of at least one second artifact document may comprise through operation of at least one processor an act of generating a graphical user interface (GUI) through a display device that enables a first sequence of artifact information of the at least one first artifact document and a second sequence of artifact information of the at least one second artifact document stored in a data store and of a merge bar to be displayable in the GUI; an act of receiving at least one first input through an input device corresponding to a first selection of the at least one first artifact document and of the at least one second artifact document; an act of causing the first sequence of artifact information of the at least one first artifact document and the second sequence of artifact information of the at least one second artifact document corresponding to the first selection to be displayed in the GUI; an act of determining at least one first subsequence of the first sequence and at least one second subsequence of the second sequence which are at least related to each other; an act of causing the at least one first subsequence and the at least one second subsequence to be displayed in the GUI in a highlighted manner; an act of receiving at least one second input through the input device corresponding to a second selection of the at least one first subsequence and the at least one second subsequence which are to be merged; an act of determining at least one merge action available for merging the at least one first subsequence and the at least one second subsequence corresponding to the second selection; an act of causing the at least one merge action to be displayed in the merge bar in the GUI; an act of receiving at least one third input through the input device corresponding to a third selection of the at least one merge action; an act of creating at least one first amended subsequence of artifact information by merging the at least one first subsequence and at least one second subsequence according to the at least one merge action corresponding to the third selection.

A further example may include non-transitory computer readable medium encoded with executable instructions (such as a software component on a storage device) that when executed, causes at least one processor to carry out this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIGS. 2 and 3 illustrate a first series of exemplary graphical user interfaces comprising results that may be displayed to a user using the product system shown in FIG. 1;

Figure 6:
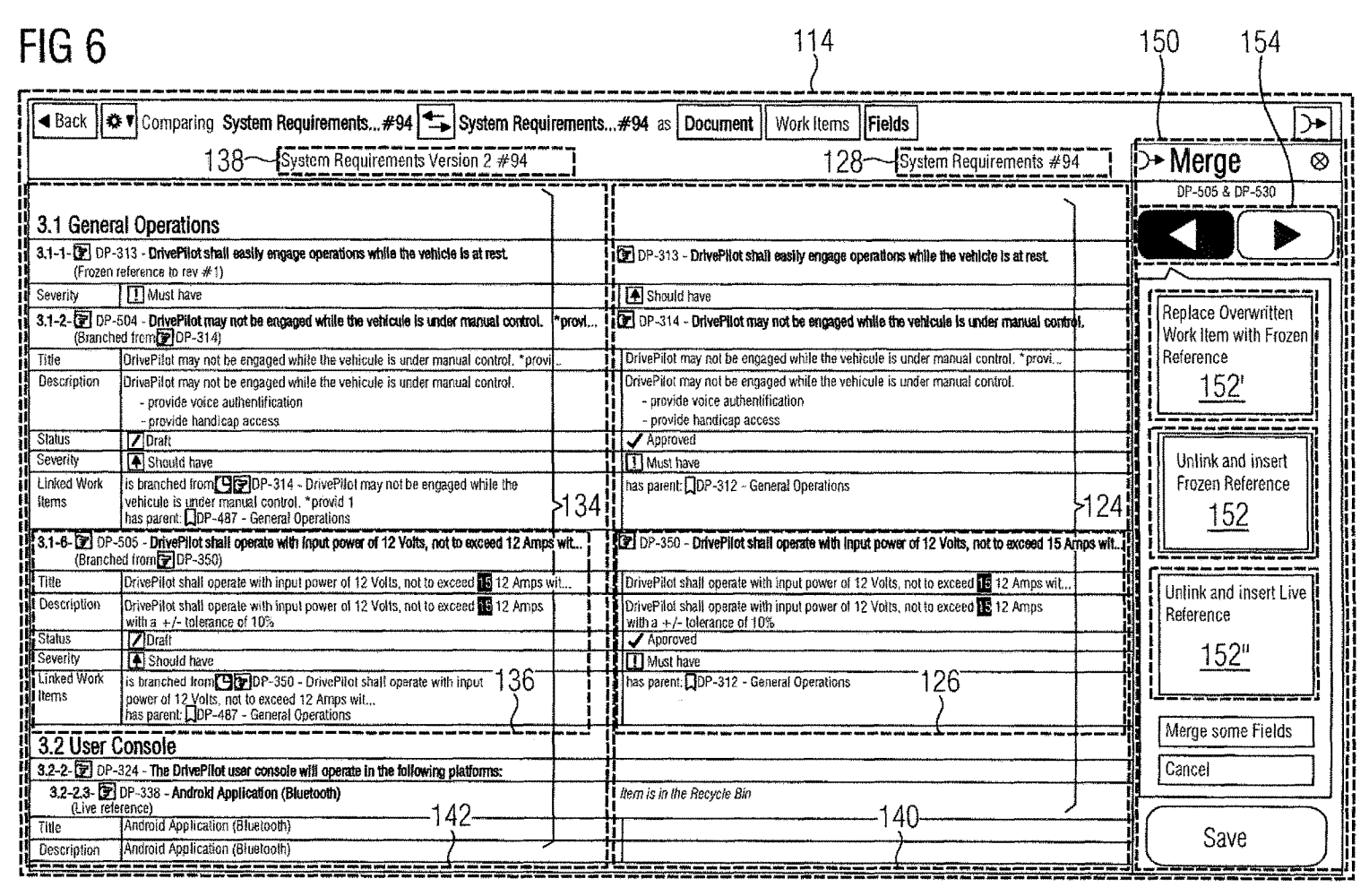

FIGS. 5-8 illustrate a second series of exemplary graphical user interfaces comprising results that may be displayed to a user using the product system shown in FIG. 1;

DETAILED DESCRIPTION

Figure 1:
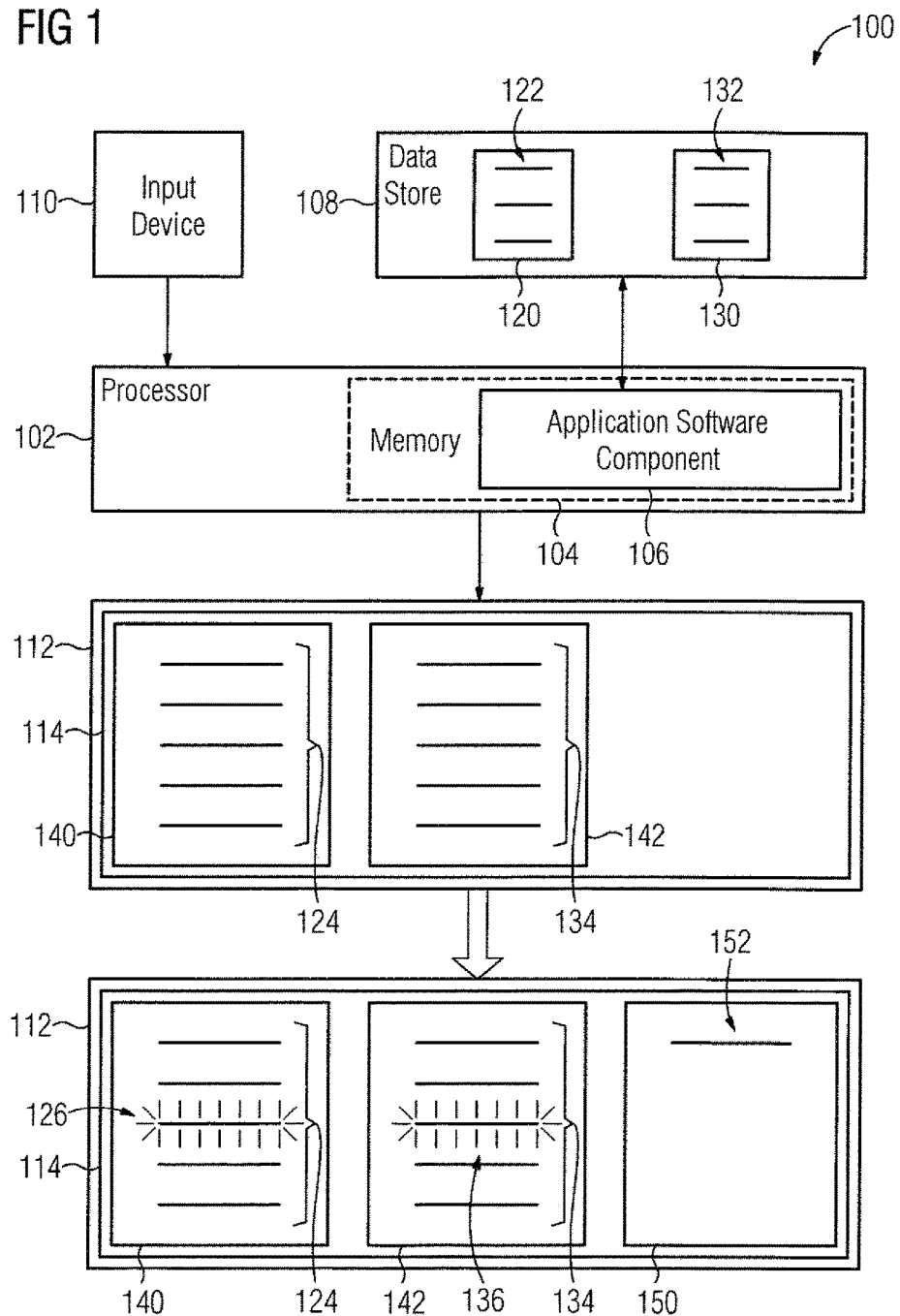
FIG. 1 illustrates a functional block diagram of an example system that facilitates merging artifact information in a product system.

Various technologies that pertain to systems and methods for merging artifact information of at least one first artifact document and of at least one second artifact document in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates merging artifact information 122 of at least one first artifact document 120 and artifact information 132 of at least one second artifact document 130. The processing system 100 may include at least one processor 102 that is configured to execute at least one application software component 106 from a memory 104 accessed by the processor 102. The application software component 106 may be configured (i.e., programmed) to cause the processor 102 to carry out various acts and functions described herein. For example, the described application software component 106 may include and/or correspond to one or more components of PLM or ALM software application that is configured to generate and store product data in a data store 108 such as a database.

Examples of PLM systems that may be adapted to include the merging artifact information features described herein may include the Active Workspace features of Teamcenter, the NX suite of applications, Solid Edge, and/or LMS Imagine.LAB applications, all of which applications are produced by Siemens Product Lifecycle Management Software Inc., of Plano Tex. Examples of ALM systems that may be adapted to include the merging artifact information features described herein may include Polarion ALM, an application produced by Polarion AG, of Gossau, Switzerland. However, it should be appreciated that the systems and methods described herein may be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

It should be appreciated that it can be difficult and time-consuming to merge artifact information from two artifact documents (e.g., data records representing/storing data corresponding to parts, tools, documents, process descriptions, templates, materials, requirements specifications) in complex, production PLM or ALM environments. For example, artifact information may have to be compared in one window, and in another the changes may have to be performed manually, which is a long and not efficient process.

To enable the enhanced merging of artifact information of at least one first artifact document 120 and of at least one second artifact document 130, the described processing system 100 may include at least one input device 110 and at least one display device 112 (such as a display screen). The described processor 102 may be configured to generate a GUI 114 through the display device 112. Such a GUI may include GUI elements such as buttons, links, search boxes, lists, text boxes, images, scroll bars) usable by a user to provide inputs through the input device 110 that cause merging artifact information of at least one first artifact document 120 and of at least one second artifact document 130 from a data store 108. In particular, the GUI may comprise a first box 140 for displaying a first sequence 124 of artifact information 122 of the first artifact document 120, a second box 142 for displaying a second sequence 134 of artifact information 132 of the second artifact document 130 and third box 150 corresponding to a merge bar for displaying at least one available merge action.

In an example embodiment, the application software component 106 and/or the processor 102 may be configured to receive at least one first input through the input device 110 corresponding to a first selection of the at least one first artifact document 120 and of the at least one second artifact document 130. Responsive to the first selection, the application software component 106 and/or the processor 102 may be configured to display the first sequence 124 of artifact information 122 of the at least one first artifact document 120 in the first box 140 and the second sequence 134 of artifact information 132 of the at least one second artifact document 130 in the second box 142 in the GUI 114.

For the enhanced merging of artifact information the processor 102 may be configured determine at least one first subsequence 126 of the first sequence 124 and at least one second subsequence 136 of the second sequence 134 which are at least related to each other, e.g. by using a compare algorithm for comparing the first sequence 124 of artifact information 122 of the first artifact document 120 and the second sequence 134 of artifact information 132 of the second artifact document 130.

Such an algorithm may for example recognize identical subsequences within the first sequence 124 and the second sequence 134. In another example, such an algorithm also recognizes similar subsequences within the first sequence 124 and the second sequence 134, e.g. using semantics and/or heuristics. Such similar subsequences may comprise a first subsequence and a second subsequence, wherein the second subsequence may comprise amended artifact information compared to the artifact information of the first subsequence. The amended artifact information may be such that pieces of artifact information may be missing, added or amended with respect to the first sequence.

The application software component 106 and/or the processor 102 may be configured to display the first subsequence 126 and the second subsequence 136 which are at least related to each other in a highlighted manner in the GUI, in particular in the first box 140 and the second box 142, respectively.

In addition, the application software component 106 and/or the processor 102 may be configured to receive at least one second input through the input device 110 corresponding to a second selection of the at least one first subsequence 126 and the at least one second subsequence 136 which are to be merged.

Responsive to the second selection, the application software component 106 and/or the processor 102 may be configured to determine at least one merge action 152 available for merging the at least one first subsequence 126 and the at least one second subsequence 136. In an example, the application software component 106 and/or the processor 102 may then be configured to cause the at least one available merge action 152 to be displayed in the third box 150 corresponding to the merge bar in the GUI 144.

The application software component 106 and/or the processor 102 may furthermore be configured to receive at least one third input through the input device 110 corresponding to a third selection of the at least one merge action 152. Responsive to the third selection, the application software component 106 and/or the processor 102 may furthermore be configured to create at least one first amended subsequence of artifact information by merging the at least one first subsequence and at least one second subsequence according to the at least one merge action corresponding to the third selection.

The described examples may provide an efficient way for users to merge artifact information of at least one first artifact document and of at least one second artifact document, in particular by providing an easy-to-read compare view through highlighting identical or related subsequences within two artifact documents. In order to easily identify related artifact information within two artifact documents, a compare algorithm may be used which may run after opening a compare view in the GUI, wherein for the compare view the first box for displaying the first sequence and the second box for displaying the second sequence may be used. For the example of performing an insert action, in particular the compare view may help to identify a potential place of a merged piece of artifact information within one of the considered artifact documents. The application software component 106 and/or the processor 102 may be configured to make a corresponding suggestion for the place of the amendment.

In an example, the compare algorithm may be used for specific pieces of artifact information to be shown within the structure of the respective artifact document using a compare view comprising said first box 140 and said second box 142.

In example embodiments, the at least one processor may be configured to determine a relation between the first subsequence 126 and the second subsequence 136 by comparing headings or parents of the first subsequence 126 and the second subsequence 136. Some types of artifact documents may comprise headings or may be master documents to a branch document or vice versa, wherein in an example, the compare algorithm identifies identical or related headings in the artifact information 122 of the first artifact document 120 and in the artifact information 132 of the second artifact document 130. Instead of or additionally to the headings, other artifact information, e.g. the same parents or the same branches, may be used to identify subsequences of artifact documents which are identical or at least related to each other. This allows for merging the first subsequence 126 and the second subsequence 136 such that a created first amended subsequence may be introduced at an identical or related place within the corresponding, currently revised artifact information of the corresponding artifact document.

Consequently, the suggested enhanced merging of artifact information is of advantage compared to another approach which does not provide a convenient compare view or a merge bar but rather simply place amended artifact information to the very bottom of the corresponding artifact document so that the user has to manually identify the correct place in the artifact document for the amended artifact information and then manually move it there. In contrast to this other approach, the suggested enhanced merging of artifact information makes it now easy to compare, merge, and review changes within an artifact document. Therefore, the process is now made easier, faster, and more efficient.

In example embodiments, the merging of artifact information may be facilitated with the help of the merge bar which allows to easily select the respective subsequences to be merged and to easily select an available merge action to be carried out.

In further examples, the processor 102 may be configured to cause the first amended subsequence to be displayed in the GUI 114. This may allow the user to see the suggested amendment so that in a further step, the user may check the at least one amended subsequence and then accept, dismiss or amend the suggested amendment.

It should also be appreciated that in other examples, the processor 102 may be configured to create the first amended subsequence of artifact information in the first artifact document 120 or in the second artifact document 130 corresponding to the third selection. Consequently, the first amended subsequence of artifact information may automatically be stored in the respective target artifact document which allows for automatically merging artifact information and therefore provides a particularly efficient merging process.

In further examples, the processor 102 may be configured to replace the first subsequence 126 in the first artifact document 120 with the one first amended subsequence of artifact information. This type of merge may occur when the first artifact document 120 is a master document and the second artifact document 130 is a branch document and a second subsequence 136 of the second artifact document 130 shall be merged into the first artifact document 120 at the position of the corresponding first subsequence 126 through replacing said first subsequence 126.

It should also be appreciated that in other examples, the processor 102 may be configured to insert one of the first subsequence 126 and the second subsequence 136 into the second sequence 134 or the first sequence 124. This situation may be understood as an embodiment of available merge actions for merging subsequences corresponding to the second selection. This merge action may be an "insert" merge action for which a subsequence of one of the artifact documents is inserted as additional artifact information into the other artifact document.

In further examples, the at least one merge action available for merging the at least one first subsequence and the at least one second subsequence corresponding to the second selection may involve the at least one processor being configured to replace one of the first subsequence 126 or the second subsequence 136 with the second subsequence 136 or the at least one first subsequence 126, wherein the at least one first subsequence 126 or the at least one second subsequence 136 can be void. This situation may be understood as an embodiment of available merge actions for merging subsequences corresponding to the second selection. This merge action may be a "replace" merge action for which a subsequence of one of the artifact documents is inserted as additional artifact information into the other artifact document replacing the corresponding subsequence of this other artifact document. In case that one of the considered subsequences is void this merge action may correspond to a "delete" merge action when a void subsequence replaces a non-void subsequence and may alternatively correspond to an "insert" merge action when a non-void subsequence replaces a void subsequence.

It should also be appreciated that in other examples, the processor 102 may be configured to reference the first subsequence 126 to the second subsequence 136 or the second subsequence 136 to the first subsequence 126. This situation may be understood as an embodiment of available merge actions for merging subsequences corresponding to the second selection. This merge action may be a special type of insert merge action for which a reference to a subsequence of one of the artifact documents is inserted as additional artifact information into the other artifact document. This merge action may be helpful when, e.g., the first artifact document 120 is a master document and the second artifact document 130 is a branch document with more recent artifact information 132 which shall be introduced into the master document.

For these examples, the referencing may be realized as a live reference or as a frozen reference. A life reference may be particularly useful for incorporating future additional amendments in the artifact information 132 of said branch document into an updated and always up-to-date version of the first artifact document 120. A frozen reference may be used for incorporating current amendments in the artifact information 132 of said branch document into the first artifact document 120, wherein future amendments of said branch document shall not automatically be incorporated into the master document.

In further examples, the at least one merge action available to a user may depend on at least one of a user status, a user security, an authentication status an artifact document status, or any combination thereof. Correspondingly, the processor 102 is configured to display in the third box 150 which corresponds to the merge bar only those merge actions which are available to a specific user. This may allow for a security concept which is adapted to different user groups, such as administrators which have full permission, regular uses which have restricted permission and guests which have minimum permission to amend, and in particular to delete, artifact information of the considered artifact document. The available merge actions may only be available if the respective user has correctly authenticated which improves security of the handled artifact document. The available merge actions may only comprise predefined merge actions which depend on the artifact document status, so that e.g. references are only allowed from a branch document to a master document and not vice versa.

For all of the examples, the artifact information may comprise at least one of software documentation, applications, a complex data object, work items, requirements, tasks, change requests, defects or test cases, or any combination thereof. The artifact information may e.g. be used in the context of agile software development.

The described examples may provide an efficient way for users to merge virtually any type of object data (e.g., parts, tools, documents, process descriptions, templates, materials, requirements or any other type of product data) stored in a data store by enabling the described enhanced merging of artifact information. Thus, the described examples may reduce the total cost of ownership of the application software component, by alleviating or at least minimizing the need for users or administrators to manually set up and manage compare views and find adequate places for introducing amended artifact information in an artifact document. Such efficient PLM or ALM merge actions can be leveraged in any industry (e.g., Aerospace & Defense, Automotive & Transportation, Consumer Products & Retail, Electronics & Semiconductor, Energy & Utilities, Industrial Machinery & Heavy Equipment, Marine, or Medical Devices & Pharmaceuticals). Such merge actions may also be applicable to consumer facing documents which shall be merged.

Figure 3:
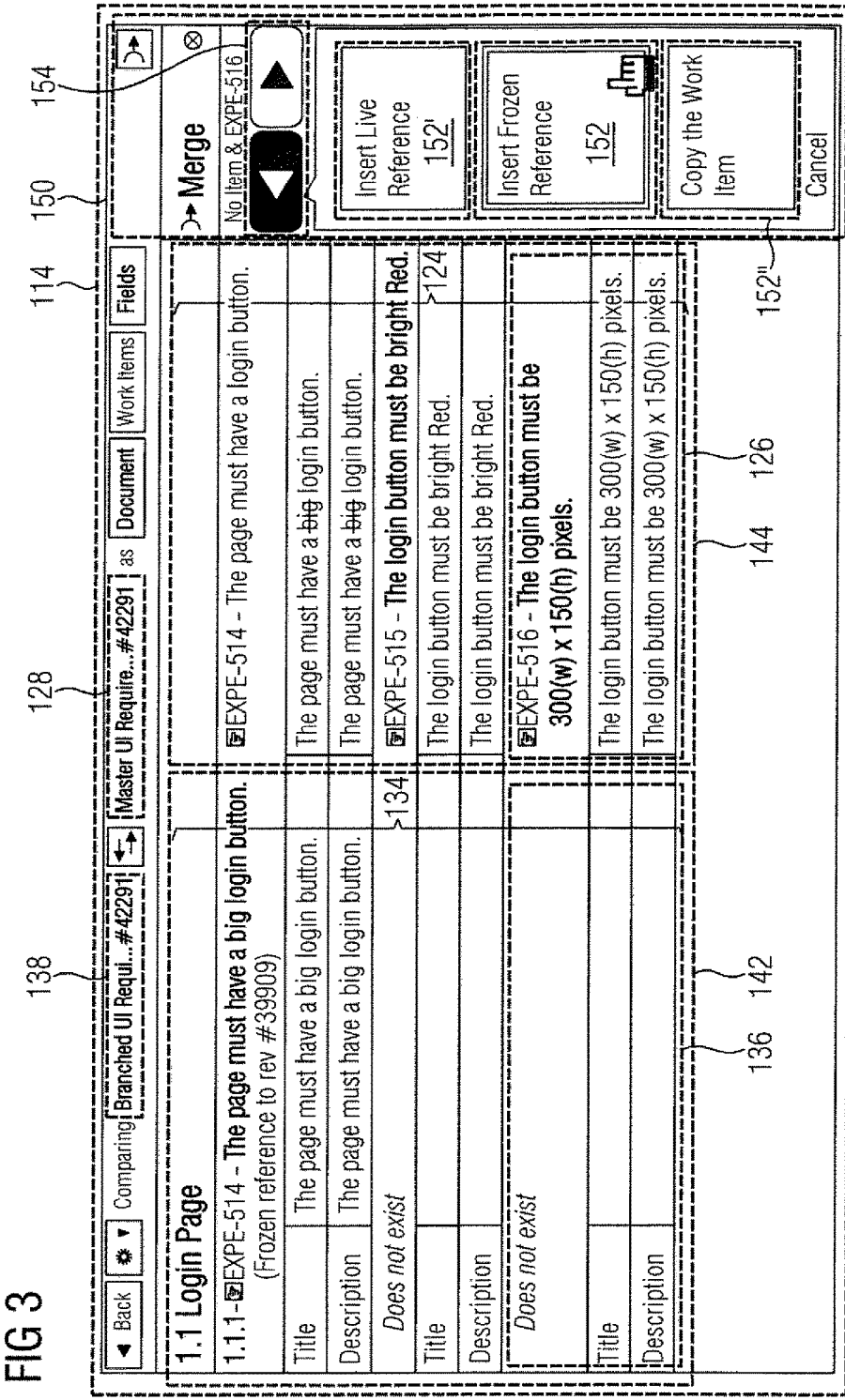

Referring now to FIGS. 2 and 3, a first series of exemplary graphical user interfaces comprising results that may be displayed to a user using the product system shown in FIG. 1 is illustrated. The GUI 114 comprises a first box 140 for displaying a first sequence 124 of artifact information of a first artifact document called "Master UI Require . . . #42291", as indicated in a first sub-box 128. Furthermore, the GUI 114 comprises a second box 142 for displaying a second sequence 134 of artifact information of the second artifact document called "Branched UI Require . . . #42291", as indicated in a second sub-box 138. As can readily be seen, the first sequence 124 differs from the second sequence 134 in the following features: in paragraph "EXPE-514", the word "big" has been deleted twice in the first sequence 124 and paragraphs "EXPE-515" to "EXPE-526" do not exist in the second sequence 134.

In FIG. 2, the first artifact document is displayed on the left and the second artifact document on the right of the GUI 114, whereas in FIG. 3 the second artifact document is displayed on the left, the first artifact document displayed in the middle and a third box 150 for displaying a merge bar is displayed on the right of the GUI 114.

In FIG. 3, a first subsequence 126 of the first sequence 124 and a second subsequence 136 of the second sequence 134 are highlighted, e.g. using colors or bold font, and available merge actions 152, 152', and 152" are displayed in the third box 150 corresponding to the merge bar. As displayed in FIG. 3, one merge action 152 "Insert Frozen Reference" has been selected which shall be applied from right to left, i.e. from the first artifact document to the second artifact document, as indicated in a third sub-box which is located inside the third box 150. This means that the artifact information of the first subsequence 126 is to be inserted as a frozen reference into the adequate position within the second sequence 134. In this case, the second subsequence 136 is void or simply contains information that artifact information corresponding to the first subsequence 126 does not exist.

Figure 4:
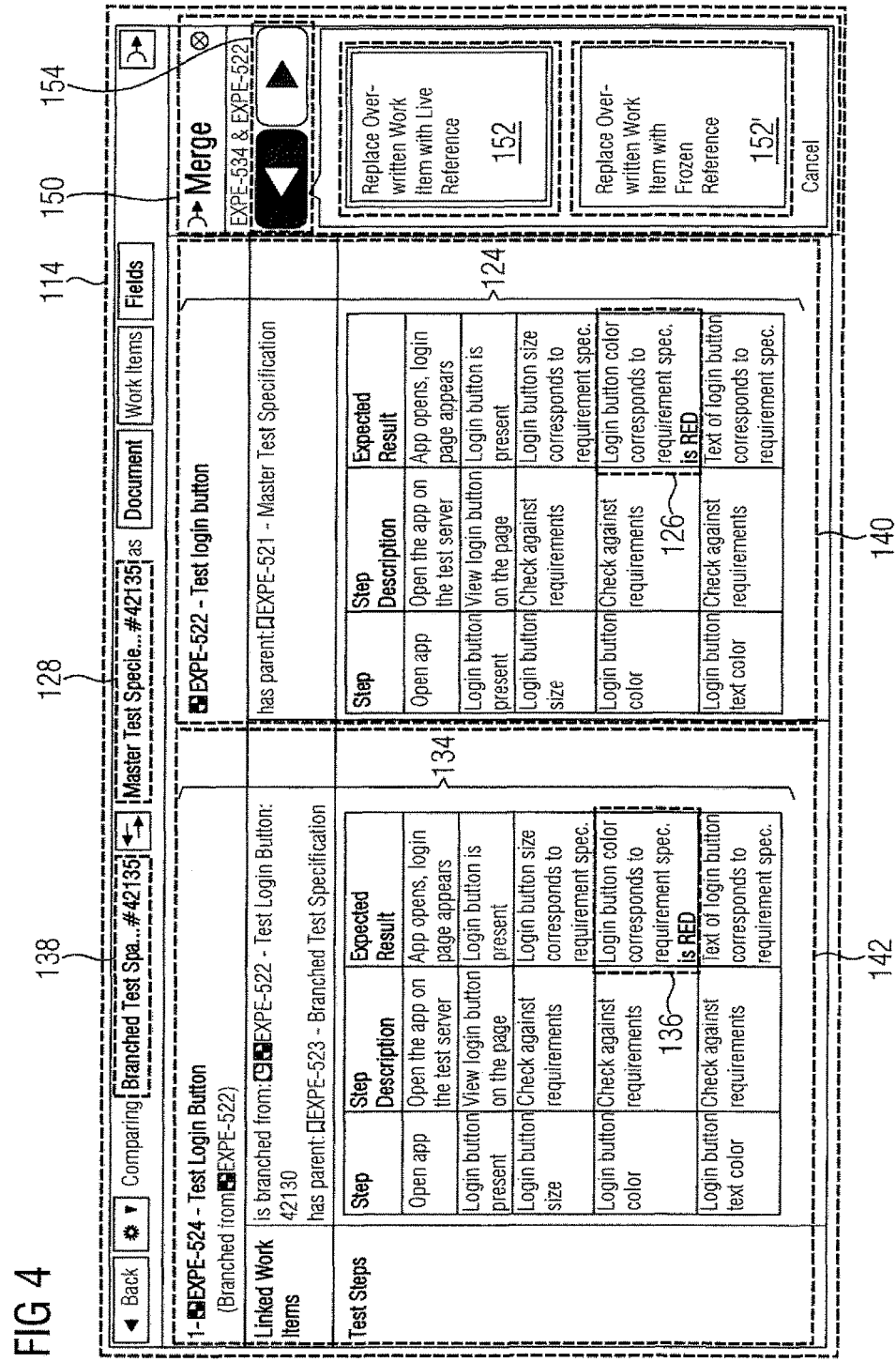
FIG. 4 illustrates another exemplary graphical user interface comprising results that may be displayed to a user using the product system shown in FIG. 1.
Figure 8:
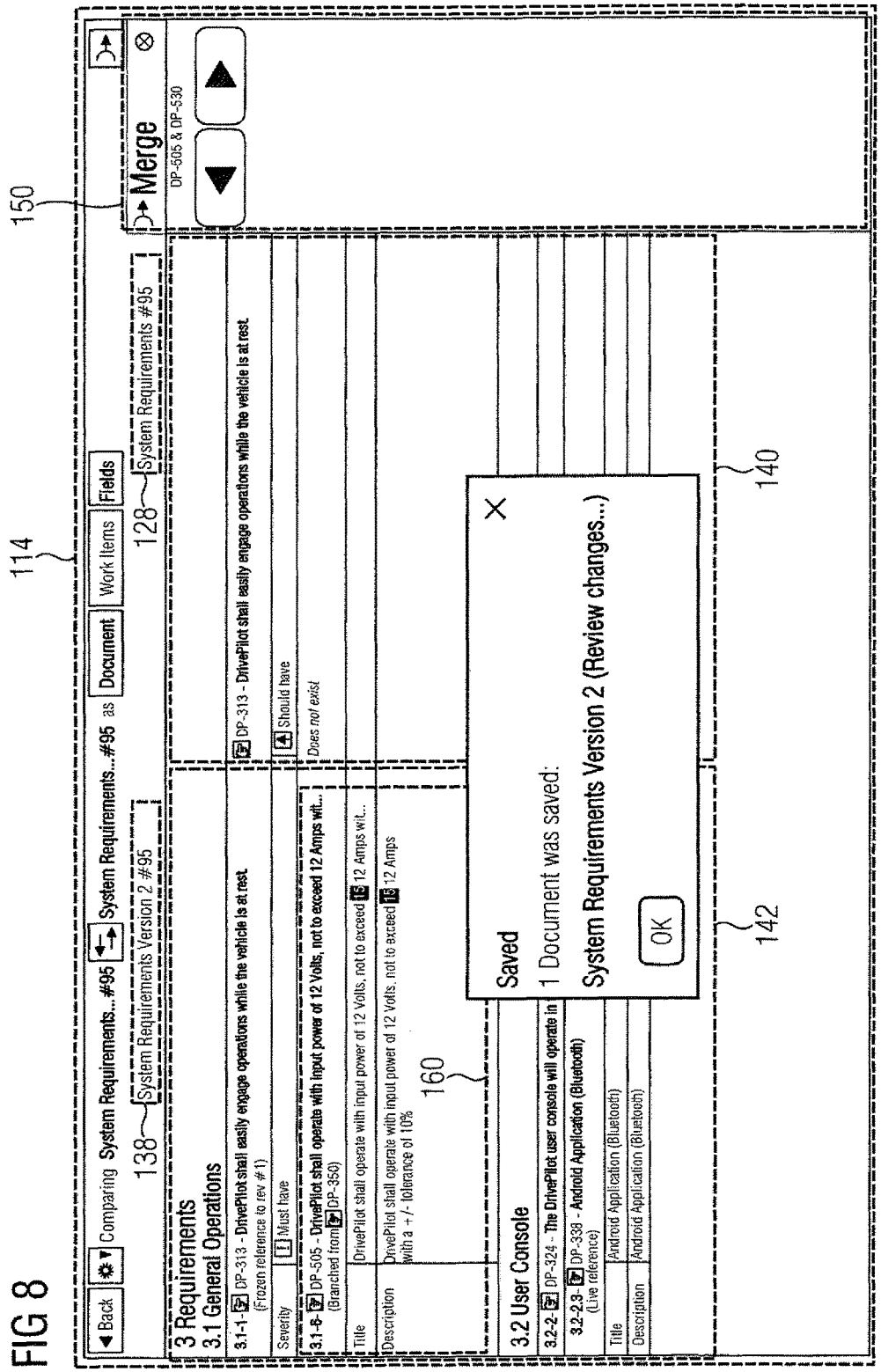

Referring now to FIG. 4, another exemplary graphical user interface comprising results that may be displayed to a user using the product system shown in FIG. 1 is illustrated. Here, the first artifact document is called "Master Test Speci . . . #42135" and displayed in the middle of the GUI 114, and the second artifact document is called "Branched Test Spe . . . #42135" and displayed on the left of the GUI 114. The displayed first sequence 124 and second sequence 134 differ among other things in the artifact information comprised in the first subsequence 126 and the second subsequence 136, wherein the two subsequences are highlighted. On the right of the GUI 114 the third box 150 is arranged indicating two available merge actions 152 and 152', wherein the merge action 152 "Replace Overwritten Work Item with Life Reference" has been selected to be applied to the left, as indicated in the third sub-box 154.

Referring now to FIGS. 5-8, a second series of exemplary graphical user interfaces comprising results that may be displayed to a user using the product system shown in FIG. 1 is illustrated. Here, the first artifact document is called "System Requirements #94" and displayed on the right (FIG. 5) and in the middle (FIGS. 6-8) of the GUI 114. The second artifact document is called "System Requirements Version 2 #94" and displayed on the left of the GUI 114. The displayed first sequence 124 and second sequence 134 differ among other things in the artifact information comprised in the first subsequence 126 and the second subsequence 136, wherein the two subsequences are illustrated and highlighted in FIGS. 6-8. Also in FIGS. 6-8, on the right of the GUI 114 the third box 150 is arranged indicating three available merge actions 152, 152' and 152", wherein the merge action 152 "Unlink and insert Frozen Reference" has been selected to be applied to the left, as indicated in the third sub-box 154. As illustrated in FIG. 7 an additional box opens for the user to confirm the selected merge action which is then applied to the second artifact document by introducing a first amended subsequence 160 corresponding to the selected merge action if it is confirmed by the user.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Figure 9:
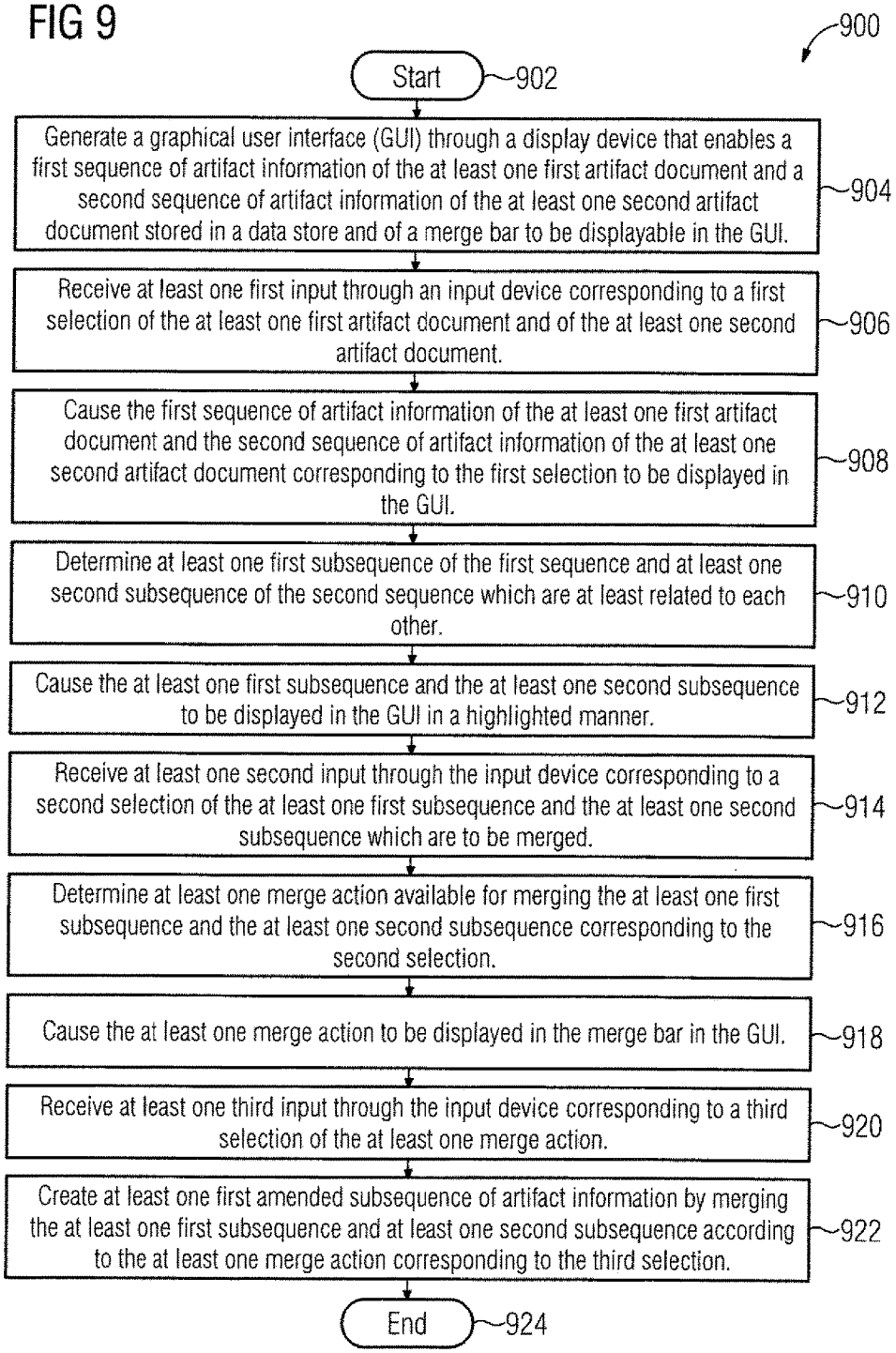
FIG. 9 illustrates a flow diagram of an example methodology that facilitates merging artifact information in a product system.

Referring now to FIG. 9, a methodology 900 that facilitates merging artifact information of at least one first artifact document and of at least one second artifact document is illustrated. The method may start at 902 and the methodology may include several acts carried out through operation of at least one processor.

These acts may include an act 904 of generating a graphical user interface (GUI) through a display device that enables a first sequence of artifact information of the at least one first artifact document and a second sequence of artifact information of the at least one second artifact document stored in a data store and of a merge bar to be displayable in the GUI; an act 906 of receiving at least one first input through an input device corresponding to a first selection of the at least one first artifact document and of the at least one second artifact document; an act 908 of causing the first sequence of artifact information of the at least one first artifact document and the second sequence of artifact information of the at least one second artifact document corresponding to the first selection to be displayed in the GUI; an act 910 of determining at least one first subsequence of the first sequence and at least one second subsequence of the second sequence which are at least related to each other; an act 912 of causing the at least one first subsequence and the at least one second subsequence to be displayed in the GUI in a highlighted manner; an act 914 of receiving at least one second input through the input device corresponding to a second selection of the at least one first subsequence and the at least one second subsequence which are to be merged; an act 916 of determining at least one merge action available for merging the at least one first subsequence and the at least one second subsequence corresponding to the second selection; an act 918 of causing the at least one merge action to be displayed in the merge bar in the GUI; an act 920 of receiving at least one third input through the input device corresponding to a third selection of the at least one merge action; an act 922 of creating at least one first amended subsequence of artifact information by merging the at least one first subsequence and at least one second subsequence according to the at least one merge action corresponding to the third selection. At 924 the methodology may end.

It should be appreciated that the methodology 900 may include other acts and features discussed previously with respect to the processing system 100. For example, the methodology may include the act of causing the GUI to display the at least one first amended subsequence.

In addition the methodology may include the act of replacing one of the at least one first subsequence or the at least one second subsequence with the at least one second subsequence or the at least one first subsequence, wherein the at least one first subsequence or the at least one second subsequence can be void.

Further, the methodology may include the act of referencing the at least one first subsequence to the at least one second subsequence or the at least one second subsequence to the at least one first subsequence, wherein the referencing may be realized as a live reference or as a frozen reference.

In addition, in a further example, the methodology may include the act of causing the GUI to display the first sequence of artifact information of the at least one first artifact document on the left in the GUI, and causing the GUI to display the second sequence of artifact information of the at least one second artifact document on the right in the GUI.

Example embodiments of the methodology may also include, after determining at least one merge action available for merging the at least one first subsequence and the at least one second subsequence corresponding to the second selection, the act of causing the GUI to display the first sequence of artifact information of the at least one first artifact document on the left in the GUI, and causing the GUI to display the second sequence of artifact information of the at least one second artifact document in the middle in the GUI, and causing the GUI to display the merge bar to be displayed on the right in the GUI.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 10:
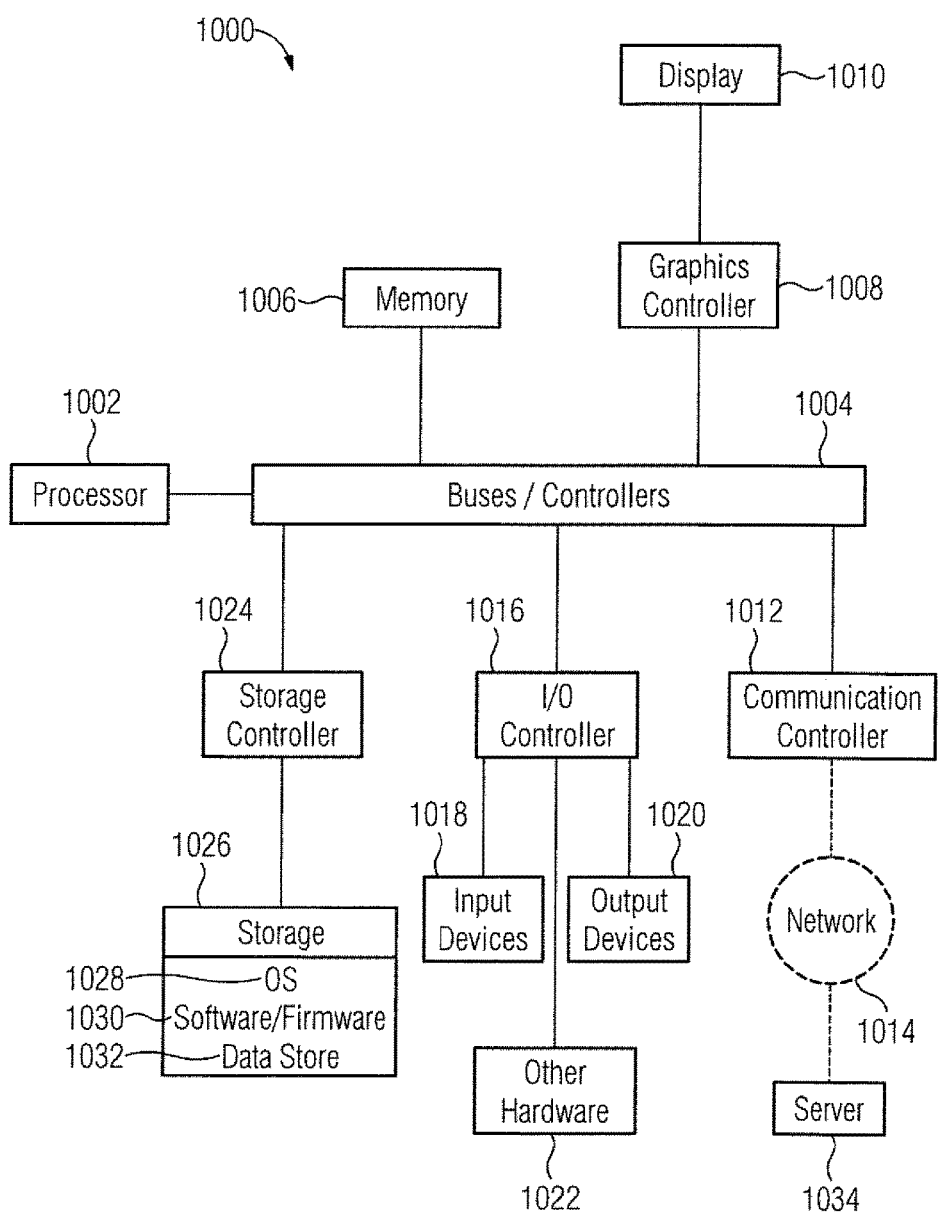
FIG. 10 illustrates a block diagram of a data processing system in which an embodiment can be implemented.

FIG. 10 illustrates a block diagram of a data processing system 1000 (also referred to as a computer system) in which an embodiment can be implemented, for example, as a portion of a product system, and/or other system operatively configured by software or otherwise to perform the processes as described herein. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). It should also be appreciated that various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 1002 may be integrated into a housing (such as a tablet) that includes a touch screen that serves as both an input and display device. Further, it should be appreciated that some input devices (such as a laptop) may include a plurality of different types of input devices (e.g., touch screen, touch pad, keyboard). Also, it should be appreciated that other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (not a part of data processing system 1000), which can be any public or private data processing system network or combination of networks, as known to those of skill in the art, including the Internet. Data processing system 1000 can communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke 35 USC § 112(f) unless the exact words "means for" are followed by a participle.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A system for merging artifact information of at least one first artifact document and of at least one second artifact document, said system comprising at least one processor configured to generate a graphical user interface (GUI) through a display device that enables a first sequence of artifact information of the at least one first artifact document and a second sequence of artifact information of the at least one second artifact document stored in a data store and of a merge bar to be displayable in the GUI;

receive at least one first input through an input device corresponding to a first selection of the at least one first artifact document and of the at least one second artifact document;

cause the first sequence of artifact information of the at least one first artifact document and the second sequence of artifact information of the at least one second artifact document corresponding to the first selection to be displayed in the GUI;

determine at least one first subsequence of the first sequence and at least one second subsequence of the second sequence which are at least related to each other;

cause the at least one first subsequence and the at least one second subsequence to be displayed in the GUI in a highlighted manner;

receive at least one second input through the input device corresponding to a second selection of the at least one first subsequence and the at least one second subsequence which are to be merged;

determine at least one merge action available for merging the at least one first subsequence and the at least one second subsequence corresponding to the second selection;

cause the at least one merge action to be displayed in the merge bar in the GUI;

receive at least one third input through the input device corresponding to a third selection of the at least one merge action; and create at least one first amended subsequence of artifact information by merging the at least one first subsequence and at least one second subsequence according to the at least one merge action corresponding to the third selection.

2. The system according to claim 1, wherein the at least one processor is configured to determine a relation between the at least one first subsequence and the at least one second subsequence by comparing headings or parents of the at least one first subsequence and the at least one second subsequence.

3. The system according to claim 1, wherein the at least one processor is configured to cause the at least one first amended subsequence to be displayed in the GUI.

4. The system according to claim 1, wherein the at least one processor is configured to store the at least one first amended subsequence of artifact information in the at least one first artifact document or in the at least one second artifact document corresponding to the third selection.

5. The system according to claim 1, wherein the at least one processor is configured to replace the at least one first subsequence in the at least one first artifact document with the at least one first amended subsequence of artifact information in the at least one first artifact document.

6. The system according to claim 1, wherein, for the at least one merge action available for merging the at least one first subsequence and the at least one second subsequence corresponding to the second selection, the at least one processor is configured to insert one of the at least one first subsequence or the at least one second subsequence into the second sequence or the first sequence.

7. The system according to claim 1, wherein, for the at least one merge action available for merging the at least one first subsequence and the at least one second subsequence corresponding to the second selection, the at least one processor is configured to replace one of the at least one first subsequence or the at least one second subsequence with the at least one second subsequence or the at least one first subsequence, wherein the at least one first subsequence or the at least one second subsequence can be void.

8. The system according to claim 1, wherein, for the at least one merge action available for merging the at least one first subsequence and the at least one second subsequence corresponding to the second selection, the at least one processor is configured to reference the at least one first subsequence to the at least one second subsequence or the at least one second subsequence to the at least one first subsequence.

9. The system according to claim 8, wherein the referencing can be realized as a live reference or as a frozen reference.

10. The system according to claim 1, wherein the at least one merge action available to a user depends on at least one of a user status, a user security, an authentication status an artifact document status, or any combination thereof.

11. The system according to claim 1, wherein the artifact information comprises at least one of software documentation, applications, a complex data object, work items, requirements, tasks, change requests, defects or test cases, or any combination thereof.

12. The system according to claim 1, wherein, prior to determining at least one merge action available for merging the at least one first subsequence and the at least one second subsequence corresponding to the second selection, the at least one processor is configured to cause the first sequence of artifact information of the at least one first artifact document to be displayed on the left in the GUI, and the second sequence of artifact information of the at least one second artifact document to be displayed on the right in the GUI.

13. The system according to claim 1, wherein, after determining at least one merge action available for merging the at least one first subsequence and the at least one second subsequence corresponding to the second selection, the at least one processor is configured to cause the first sequence of artifact information of the at least one first artifact document to be displayed on the left in the GUI, the second sequence of artifact information of the at least one second artifact document to be displayed in the middle in the GUI, and the merge bar to be displayed on the right in the GUI.

14. The system according to claim 1, further comprising a computer system including a memory, an application software component, the at least one processor, the display device, and the input device, wherein the application software component is comprised of instructions that when included in the memory and executed by the at least one processor, cause the at least one processor to generate the GUI through the display device responsive to inputs through the input device.

15. A method for merging artifact information of at least one first artifact document and of at least one second artifact document, comprising:

through operation of at least one processor:
generating a graphical user interface (GUI) through a display device that enables a first sequence of artifact information of the at least one first artifact document and a second sequence of artifact information of the at least one second artifact document stored in a data store and of a merge bar to be displayable in the GUI;

receiving at least one first input through an input device corresponding to a first selection of the at least one first artifact document and of the at least one second artifact document;

causing the first sequence of artifact information of the at least one first artifact document and the second sequence of artifact information of the at least one second artifact document corresponding to the first selection to be displayed in the GUI;

determining at least one first subsequence of the first sequence and at least one second subsequence of the second sequence which are at least related to each other;

causing the at least one first subsequence and the at least one second subsequence to be displayed in the GUI in a highlighted manner;

receiving at least one second input through the input device corresponding to a second selection of the at least one first subsequence and the at least one second subsequence which are to be merged;

determining at least one merge action available for merging the at least one first subsequence and the at least one second subsequence corresponding to the second selection;

causing the at least one merge action to be displayed in the merge bar in the GUI;

receiving at least one third input through the input device corresponding to a third selection of the at least one merge action; and creating at least one first amended subsequence of artifact information by merging the at least one first subsequence and at least one second subsequence according to the at least one merge action corresponding to the third selection.

16. The method according to claim 15, further comprising through operation of the at least one processor, determining a relation between the at least one first subsequence and the at least one second subsequence by comparing headings or parents of the at least one first subsequence and the at least one second subsequence.

17. The method according to claim 15, further comprising through operation of the at least one processor, causing the at least one first amended subsequence to be displayed in the GUI.

18. The method according to claim 15, further comprising through operation of the at least one processor, storing the at least one first amended subsequence of artifact information in the at least one first artifact document or in the at least one second artifact document corresponding to the third selection.

19. The method according to claim 15, further comprising through operation of the at least one processor, replacing the at least one first subsequence in the at least one first artifact document with the at least one first amended subsequence of artifact information in the at least one first artifact document.

20. The method according to claim 15, wherein the at least one merge action available for merging the at least one first subsequence and the at least one second subsequence corresponding to the second selection comprises through operation of the at least one processor: inserting one of the at least one first subsequence or the at least one second subsequence into the second sequence or the first sequence.

21. The method according to claim 15, wherein the at least one merge action available for merging the at least one first subsequence and the at least one second subsequence corresponding to the second selection comprises through operation of the at least one processor: replacing one of the at least one first subsequence or the at least one second subsequence with the at least one second subsequence or the at least one first subsequence, wherein the at least one first subsequence or the at least one second subsequence can be void.

22. The method according to claim 15, wherein the at least one merge action available for merging the at least one first subsequence and the at least one second subsequence corresponding to the second selection comprises through operation of the at least one processor: referencing the at least one first subsequence to the at least one second subsequence or the at least one second subsequence to the at least one first subsequence.

23. The method according to claim 22, wherein the referencing can be realized as a live reference or as a frozen reference.

24. The method according to claim 15, wherein the at least one merge action available to a user depends on at least one of a user status, a user security, an authentication status an artifact document status, or any combination thereof.

25. The method according to claim 15, wherein the artifact information comprises at least one of software documentation, applications, a complex data object, work items, requirements, tasks, change requests, defects or test cases, or any combination thereof.

26. The method according to claim 15, further comprising through operation of the at least one processor, prior to determining at least one merge action available for merging the at least one first subsequence and the at least one second subsequence corresponding to the second selection: causing the first sequence of artifact information of the at least one first artifact document to be displayed on the left in the GUI, and the second sequence of artifact information of the at least one second artifact document to be displayed on the right in the GUI.

27. The method according to claim 15, further comprising through operation of the at least one processor, after determining at least one merge action available for merging the at least one first subsequence and the at least one second subsequence corresponding to the second selection: causing the first sequence of artifact information of the at least one first artifact document to be displayed on the left in the GUI, the second sequence of artifact information of the at least one second artifact document to be displayed in the middle in the GUI, and the merge bar to be displayed on the right in the GUI.

28. A non-transitory computer readable medium encoded with executable instructions that when executed, cause at least one processor to carry out a method for merging artifact information of at least one first artifact document and of at least one second artifact document comprising:

generating a graphical user interface (GUI) through a display device that enables a first sequence of artifact information of the at least one first artifact document and a second sequence of artifact information of the at least one second artifact document stored in a data store and of a merge bar to be displayable in the GUI;

receiving at least one first input through an input device corresponding to a first selection of the at least one first artifact document and of the at least one second artifact document;

causing the first sequence of artifact information of the at least one first artifact document and the second sequence of artifact information of the at least one second artifact document corresponding to the first selection to be displayed in the GUI;

determining at least one first subsequence of the first sequence and at least one second subsequence of the second sequence which are at least related to each other;

causing the at least one first subsequence and the at least one second subsequence to be displayed in the GUI in a highlighted manner;

receiving at least one second input through the input device corresponding to a second selection of the at least one first subsequence and the at least one second subsequence which are to be merged;

determining at least one merge action available for merging the at least one first subsequence and the at least one second subsequence corresponding to the second selection;

causing the at least one merge action to be displayed in the merge bar in the GUI;

receiving at least one third input through the input device corresponding to a third selection of the at least one merge action; and creating at least one first amended subsequence of artifact information by merging the at least one first subsequence and at least one second subsequence according to the at least one merge action corresponding to the third selection.

* * * * *